March 6, 1951  M. MALLORY  2,544,605
INTERNAL COMBUSTION ENGINE
Filed Nov. 13, 1947  3 Sheets-Sheet 1

INVENTOR.
Marion Mallory
BY
Barnes, Kisselle, Laughlin & Raisch
ATTORNEYS

March 6, 1951 M. MALLORY 2,544,605
INTERNAL COMBUSTION ENGINE
Filed Nov. 13, 1947 3 Sheets-Sheet 2

INVENTOR.
Marion Mallory
BY
Barnes, Kisselle, Laughlin & Raisch
ATTORNEYS

INVENTOR.
Marion Mallory
ATTORNEYS

Patented Mar. 6, 1951

2,544,605

UNITED STATES PATENT OFFICE 2,544,605

INTERNAL-COMBUSTION ENGINE

Marion Mallory, Detroit, Mich.

Application November 13, 1947, Serial No. 785,606

2 Claims. (Cl. 123—41.41)

1

This invention relates to an internal combustion engine.

One of the problems presented by the internal combustion engine is that the exhaust valve gets entirely too hot, in fact red hot. In some cases the exhaust valve gets so hot that the stem adjacent to the valve melts, causing the valve to separate from the stem. The hot exhaust valve affects engine operation because the charge in and around the valve is not only heated by the compression stroke but also by the hot valve itself, causing self-ignition which is uncontrollable especially on carburetted engines, and it is due to the exhaust valves overheating, more than anything else, that makes it necessary to operate carburetted engines on low compression.

The cooling of the exhaust is very essential on the Diesel engines even though no carburetor is used because it is very desirous to keep the compressed charge as cool as possible until ignition time and, of course, if you have a red-hot exhaust valve in top of the cylinder, too much expansion takes place on the compression stroke which is back pressure against the piston resulting in a pumping loss.

It is an object of this invention to avoid preignition or detonation in the operation of an internal combustion engine due to the hot exhaust valve and this object is accomplished by cooling down the exhaust valve which not only avoids pre-ignition but also permits higher compression of the fuel mixture charge without detonation.

Figure 1:
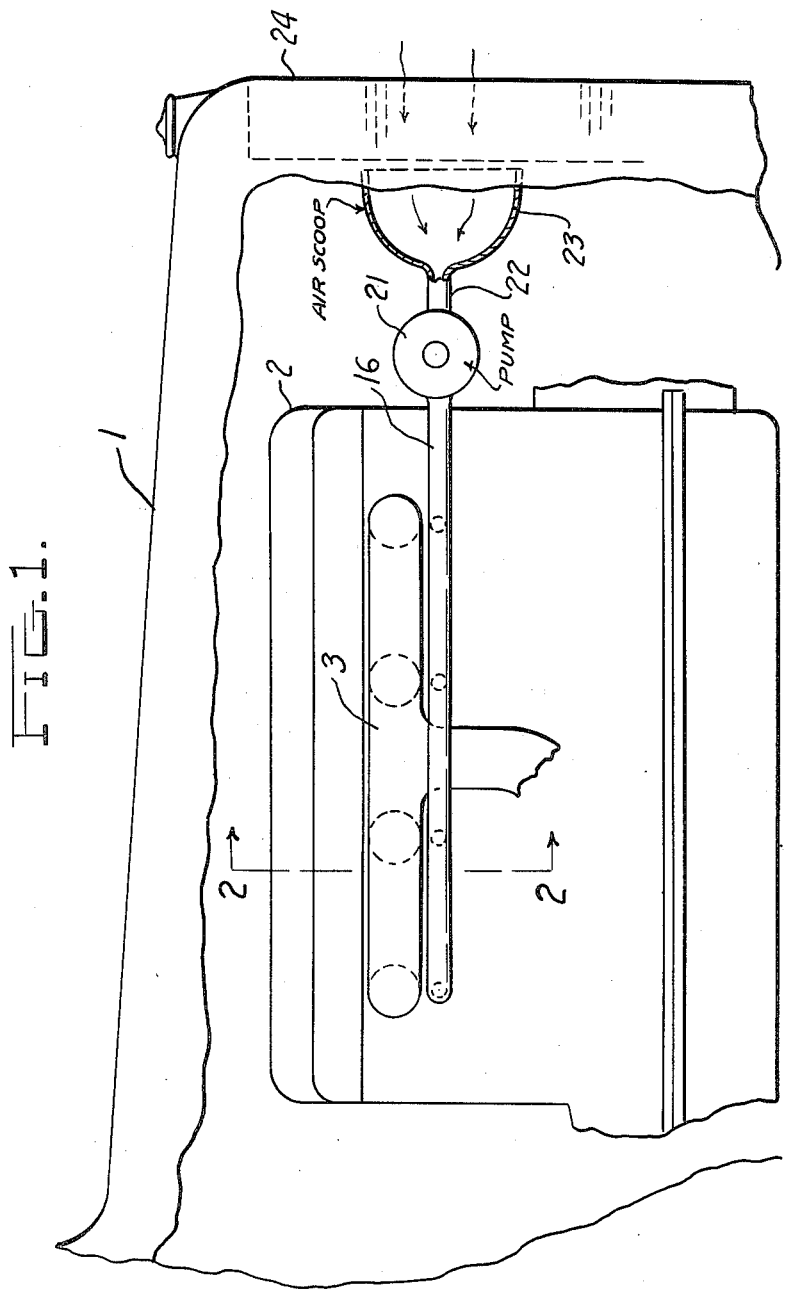
Fig. 1 is a side elevation of an internal combustion engine used for propelling an automotive vehicle, the hood portion only of the vehicle being shown.

Referring more particularly to the drawings, I have shown an automotive vehicle, the hood of which is designated 1 and the engine 2. Engine 2 is an internal combustion engine and for illustrative purposes is shown as having four cylinders provided with an exhaust manifold 3.

Each of the cylinders 5 is provided with a reciprocating piston 6, combustion chamber 7, exhaust port 8 controlled by a poppet valve having a head 9 and a stem 10. The exhaust valve opens and closes in a conventional manner and is guided in a valve guide 11. The upper portion of valve stem 10 is hollow as at 12 and the head 9 is also hollow as at 13 and is provided with a plurality of outlets or orifices 14 by means of which the interior of the hollow head communicates with the exhaust passageway 15.

Each of the exhaust valves is cooled by a fluid coolant, either liquid or gaseous. The most economical cooling fluid is air. Therefore, the engine is provided with a conduit 16. Conduit 16 is connected by means of a plurality of branch conduits 17 and passageways 18 with a chamber 19 in each of the valve guides 11 and surrounding the hollow portion 12 of stem 10. Stem 10 is provided with a plurality of inlet orifices or apertures 20 by means of which passageway 12 communicates with chamber 19. Any suitable means can be utilized for supplying fluid, such, for example, as air, under pressure to line 16.

For illustrative purposes, a pump 21 is connected into line 16 and the inlet of this pump communicates by means of conduit 22 with an air scoop 23 positioned just behind the radiator 24. The use of pump 21 for supplying air under scoop 23 will supply sufficient air to line 16. It is only necessary to have the air pressure higher than the exhaust pressures existing in the manifold so that exhaust pressures will not back up through pump 21.

Figure 2:
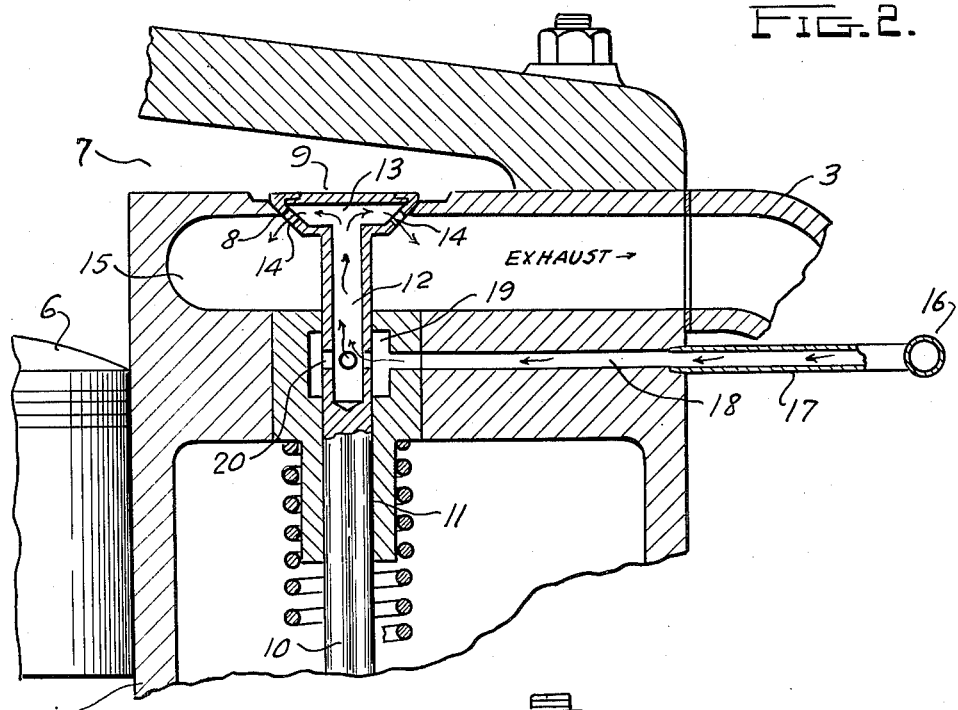
Fig. 2 is a section along the line 2—2 of Fig. 1.

In the type of construction shown in Fig. 2, the exhaust velocity passing by orifices 14 will tend to pull the air through the valve because there is a Venturi action at this point and in this case little or perhaps no pump would be required to drive the air in. The scoop 23 which forces air in and Venturi action caused by exhaust passing orifices 14 will pass air through the valve.

Figure 4:
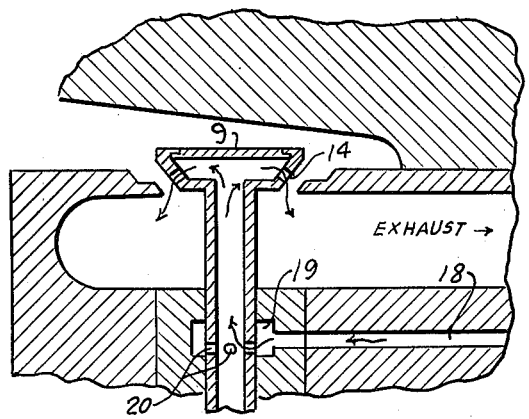
Fig. 4 is a sectional view similar to Fig. 2 showing another modified arrangement for cooling the exhaust valve.
Figure 5:
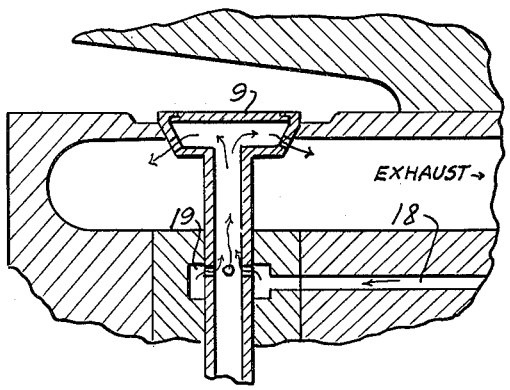
Fig. 5 is a sectional view similar to Fig. 2 but showing still another modified arrangement for cooling the exhaust valve.
Figure 6:
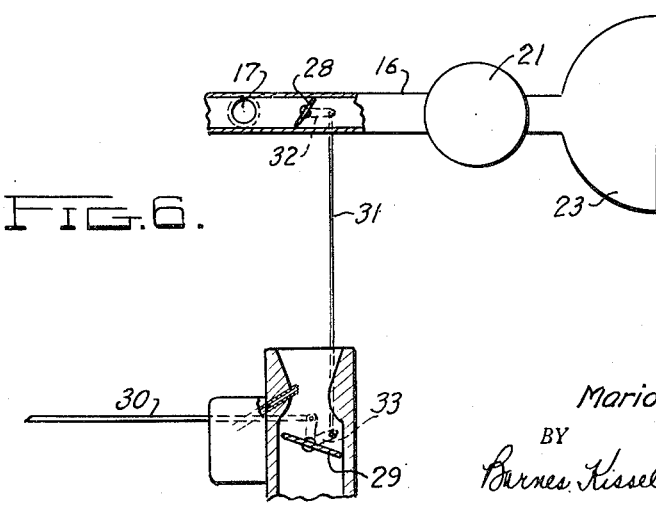
Fig. 6 is another modification showing the carburetor throttle valve connected to an air or coolant throttle valve in the main coolant conduit that operates simultaneously with the throttle valve so that more coolant is admitted to cool the exhaust valves as the throttle is moved toward open position and vice versa.

The chamber 19 around the valve guide can be made so that the orifices or holes 20 in the valve will always correspond with chamber 19. In this case there will be a continuous passage of air through the valve. However, if it is desired to time the air going through the valve so it will not flow through continuously the relief 19 in valve guide can be made narrower and located in relation to the hole in valve 20 so that air will be admitted only when the exhaust valve moves toward open position (Fig. 4) or when the exhaust valve is closed (Fig. 5). In other words, if the hole in the valve was higher, it would shut off the air passage when the exhaust valve opened (Fig. 5). If hole 20 was lower, the air passage would be shut off when the exhaust valve was closed (Fig. 4), but it is preferred to have a constant communication at all times especially if the engine is working under heavy loads and wide open throttle (Fig. 2).

When my invention is used with a carburetor type engine instead of a Diesel engine, then if desired, a valve 28 can be located in conduit 16 between pump 21 and the first branch conduit 17 that operates simultaneously with the throttle valve 29 so that more air is admitted as the throttle is moved toward an open position and less air is admitted when the throttle is moved toward a closed position. The throttle rod is designated 30 and link 31 connects crank arm 32 with crank arm 33 so that valves 28 and 29 open and close simultaneously. Sometimes a warm exhaust valve is of advantage when the engine is idling or working under real light loads and the compression is low. In this case a valve in line 17 to shut off the air under such conditions would be preferable.

From conduit 16 each valve is cooled by the air flowing from main conduit 16 through branch conduits 17, passageways 18, chamber 19, inlet openings 20, passageway 12 in the valve stem, thence through the hollow chamber 13 in the valve head and then through outlet openings 14 into exhaust passageways 15 and thence into exhaust manifold 13. This flow of air, as outlined, through valve 9 not only cools down valve 9 but also cools down exhaust passageway 15 and the wall portions thereof which form part of the wall of the combustion chamber. This flow of coolant air through the valve stem cools it down to a temperature well below the ignition temperature of the fuel charge in the combustion chamber 7 so that the ignition of the compressed fuel charge can be accurately timed and controlled by any desired ignition means.

Figure 3:
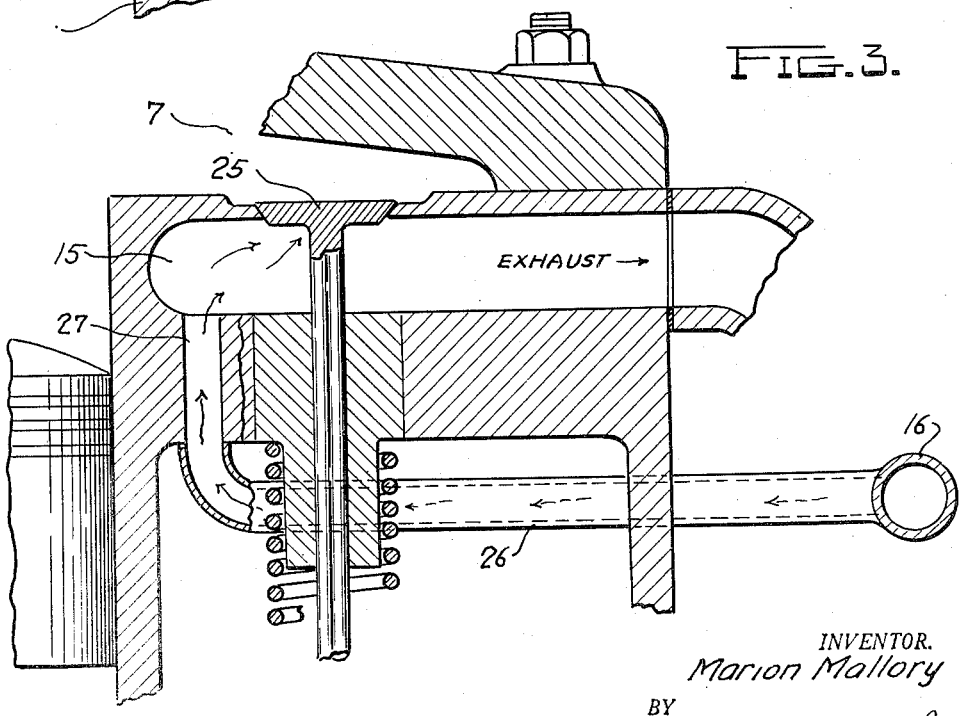
Fig. 3 is a sectional view similar to Fig. 2 but showing a modified arrangement for cooling the exhaust valve.

In the form shown in Fig. 3 the coolant air under pressure from main line 16 is supplied to each of the exhaust valves 25 by means of a branch conduit 26 and passageway 27 in the cylinder head. Valve 25 can be a conventional solid poppet valve. The air under pressure flowing through each branch conduit 26 and conduit 27 into exhaust passageway 15 not only cools down the exhaust passageway but also flows in heat exchange relation with the head and stem portion of valve 25 thereby cooling valve 25 down below the ignition temperature of the charge in combustion chamber 7.

In the operation of most any internal combustion engine, when the engine is put under hard pulls or heavy loads, the exhaust manifold will get red hot which adds heat to the exhaust valve and raises its temperature. In both forms of my invention the coolant air or fluid flowing through the exhaust passageways 15 and by the exhaust valves and into the intake manifold cools down the exhaust gases and thereby appreciably cools down the exhaust manifold which aids materially in the cooling of the exhaust valve.

In each of the cases the air flowing into the exhaust passageways 15 commingles with, and cools down the exhaust gases flowing through exhaust port 8 and therefore these exhaust gases are cooled to a temperature less than that necessary to raise the temperature of the manifold to red heat.

I claim:

1. In an internal combustion engine having an intake passageway through which motive fluid is supplied to the engine, a throttle valve for said passageway, an exhaust port, a valve for controlling said exhaust port, and an exhaust passageway, a conduit for supplying a coolant fluid into said exhaust passageway so that the coolant fluid will mix with the hot exhaust gases flowing into the exhaust passageway from said exhaust port, a throttle valve in said last mentioned conduit and operative connections between said throttle valves so that they open and close in unison whereby when the one throttle valve is opened to admit more motive fuel to the engine the other throttle valve opens to admit more coolant into said exhaust passageway.

2. The combination as set forth in claim 1 wherein the conduit is provided with an outlet so that the coolant upon flowing into the exhaust passageway flows in heat exchange relation with the exhaust valve.

MARION MALLORY.

REFERENCES CITED

The following references are of record in the file of this patent:

UNITED STATES PATENTS

| Number | Name | Date |
|---|---|---|
| 1,081,120 | Jones et al. | Dec. 9, 1913 |
| 2,052,279 | Colwell | Aug. 25, 1936 |
| 2,063,779 | Baj | Dec. 8, 1936 |
| 2,065,106 | Symons | Dec. 22, 1936 |
| 2,360,600 | Vrana | Oct. 17, 1944 |